(12) United States Patent
Matsumoto et al.

(10) Patent No.: US 7,384,160 B2
(45) Date of Patent: Jun. 10, 2008

(54) AUTOMATIC FOCUS ADJUSTMENT FOR PROJECTOR

(75) Inventors: Morio Matsumoto, Matsumoto (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 11/141,107

(22) Filed: Jun. 1, 2005

(65) Prior Publication Data

US 2005/0286026 A1    Dec. 29, 2005

(30) Foreign Application Priority Data

Jun. 23, 2004    (JP)    ............................. 2004-184391

(51) Int. Cl.
    *G03B 21/14*    (2006.01)
(52) U.S. Cl. .................................................. 353/101
(58) Field of Classification Search ................ 353/101, 353/30, 31, 69, 100; 348/745; 250/201.2, 250/201.4, 201.6, 201.7; 356/3, 3.03
    See application file for complete search history.

(56) References Cited

U.S. PATENT DOCUMENTS 4,801,963 A * 1/1989 Koyama et al. ............ 396/131
6,530,666 B1 * 3/2003 Smith et al. ................ 353/121
2002/0063852 A1 * 5/2002 Liang .......................... 353/53

FOREIGN PATENT DOCUMENTS

| EP | 0 396 259 A2 | 11/1990 |
|---|---|---|
| EP | 0 817 157 A2 | 1/1998 |
| JP | A 06-003577 | 1/1994 |
| JP | A 08-292496 | 11/1996 |
| JP | A 2000-089363 | 3/2000 |
| JP | A 2000-241874 | 9/2000 |
| JP | A 2004-93890 | 3/2004 |

* cited by examiner

*Primary Examiner*—William C. Dowling
(74) *Attorney, Agent, or Firm*—Oliff & Berridge, PLC

(57) ABSTRACT

Aspects of the invention provide a projector for displaying an image on a projection surface. The projector can include a test pattern projecting unit that projects a predetermined test pattern on the projection surface, a focus changing unit that moves a focal point of the projector, an imaging unit that performs imaging the projected test pattern to generate a shot image, an indicator value calculating unit that calculates an indicator value relating to a focus state of the shot image varying with movement of the focal point, and a focus adjustment unit that performs focus adjustment for focusing the focal point on the projection surface using the indicator value. The test pattern including a first kind and a second kind of density areas alternately arranged and having different density with each other, and at least the first kind of density areas include a narrow area and a broad area.

8 Claims, 5 Drawing Sheets

TOTAL VARIATION V=|V1|+|V2|+···+|V10|

$ra = w1/w2$
$rb = w2/w3$
$rc = w3/w4$ $ra = rb = rc$

AUTOMATIC FOCUS ADJUSTMENT FOR PROJECTOR

BACKGROUND

Aspects of the invention can relate to a projector for displaying images on a projection surface such as a screen, and specifically, to a technology of performing automatic focus adjustment.

Related art automatic focus adjustment technology for projectors, for example, can include a technology of repeating imaging of test patterns displayed on a projection surface, such as a screen and performing frequency analysis of shot images while moving the focal point and focusing it on a position where the largest amount of high frequency components are contained within the shot images. In this related art technology, the processing time increases in the case of performing frequency analysis with software, while the cost increases in the case of performing frequency analysis using dedicated hardware.

Further, in order to speed up the processing and suppress the cost, related art automatic focus adjustment technology can use contrast differences between light and dark points within a shot image to focus a focal point on a position where the contrast difference becomes largest. See, for example, Japanese Patent Application Publication No. Hei-8-292496. Further, a similar automatic focus adjustment technology can use sum of squares of brightness differences between adjacent pixels within the shot image in place of the contrast differences. See, for example, Japanese Patent Application Publication No. Hei-6-3577. Japanese Patent Application Publication No. 2000-241874 is also an example of related art.

SUMMARY

However, in the above described related art technologies, there has been a problem that, since the variation in contrast differences with the movement of focal point is small in a state almost in focus, focus adjustment is difficult to be performed with high precision. Further, there has been a problem that, since the variation in contrast differences with the movement of focal point is also small in a state largely out of focus, determination as to in which direction the projection lens should be moved takes time. Further, using the sum of square of brightness differences as in the related art technology, the variation in sum of square of brightness differences with the movement of focal point becomes larger to some extent in a state almost in focus, however, the variation is still small in a state largely out of focus. Thus, in the related art technologies, there has been a problem that it is difficult to perform automatic focus adjustment at a high speed with high precision.

An advantage of the invention is to provide a technology of enabling automatic focus adjustment at a high speed with high precision in a projector for displaying images on the projection surface such as a screen.

In order to solve at least part of the above described related art problems, a projector according to an aspect of the invention is a projector for displaying an image on a projection surface, and the projector can include a test pattern projecting unit that projects a predetermined test pattern on the projection surface, a focus changing unit that moves a focal-point of the projector, an imaging unit that performs imaging the projected test pattern to generate a shot image, an indicator value calculating unit that calculates an indicator value relating to a focus state of the shot image varying with movement of the focal point, and a focus adjustment unit that performs focus adjustment for focusing the focal point on the projection surface using the indicator value. The test pattern can include a first kind and a second kind of density areas alternately arranged and having different density with each other, and at least the first kind of density areas include a narrow area and a broad area.

In this projector, focus adjustment can be performed by imaging the test pattern projected on the projection surface to generate the shot image and using the indicator value relating to the focus state in the shot image varying with the movement of the focal point. In this case, the test pattern can include the narrow area. Accordingly, even in a state almost in focus, the indicator value increases and decreases with the change in focus state. Therefore, automatic focus adjustment can be performed with high precision. Further, the test pattern can include the broad area. Accordingly, even in a state largely out of focus, the indicator value increases and decreases with the change in focus state. Therefore, the direction of automatic focus adjustment can be promptly determined and the automatic focus adjustment can be performed at a high speed.

In the above projector, the width of the narrow area may be a width corresponding to one pixel to three pixels within the shot image, and the width of the broad area may be a width corresponding to 15 pixels to 30 pixels within the shot image. By thus arranged, even in a state almost in focus and a state largely out of focus, the indicator value can be increased and decreased with the change in focus state.

Further, in the above exemplary projector, the test pattern may include the narrow area and the broad area in both cases where a zoom state is at the most tele side and the zoom state is at the most wide side. By thus arranged, the automatic focus adjustment in plural different zoom states can be performed using one test pattern, and the convenience of automatic focus adjustment can be improved.

Further, in the above projector, the test pattern may have a constant width ratio between two areas adjacent with the second kind of density area therebetween with respect to the first density areas. By thus arranged, the test pattern includes narrow areas and broad areas in plural different zoom states, and the automatic focus adjustment in the plural different zoom states can be performed using one test pattern.

Further, in the above projector, the indicator value may be a value that indicates a degree of increase and decrease of brightness along a width direction of the first kind and second kind of density areas in the shot image.

Further, in the above projector, the indicator value may be a value correlated with a sum of absolute values of differences between adjacent local maximum values and local minimum values in a curve representing a change in brightness along the width direction. By thus arranged, appropriate automatic focus adjustment can be performed using the indicator value.

Further, in the above projector, the local maximum values and local minimum values may be brightness values in predetermined positions in the shot image set based on the density area arrangement in the test pattern. By thus arranged, the number of calculations can be reduced and further speeding up of the processing can be achieved.

Note that the invention can be realized in various aspects, for example, in modes of a projector, an image projection method and apparatus, an automatic focus adjustment method and apparatus, an image adjustment method and apparatus, and a computer program for realizing functions of these methods and apparatuses, a recording medium in which the computer program is recorded, data signals including the computer program embodied within carrier wave, and the like.

BRIEF DESCRIPTION OF THE DRAWINGS

The invention will be described with reference to the accompanying drawings, wherein like numbers reference like elements, and wherein.

DETAILED DESCRIPTION OF PREFERRED EMBODIMENTS

Next, a mode for carrying out the invention will be described according to exemplary embodiments in the order as below.

Figure 1:
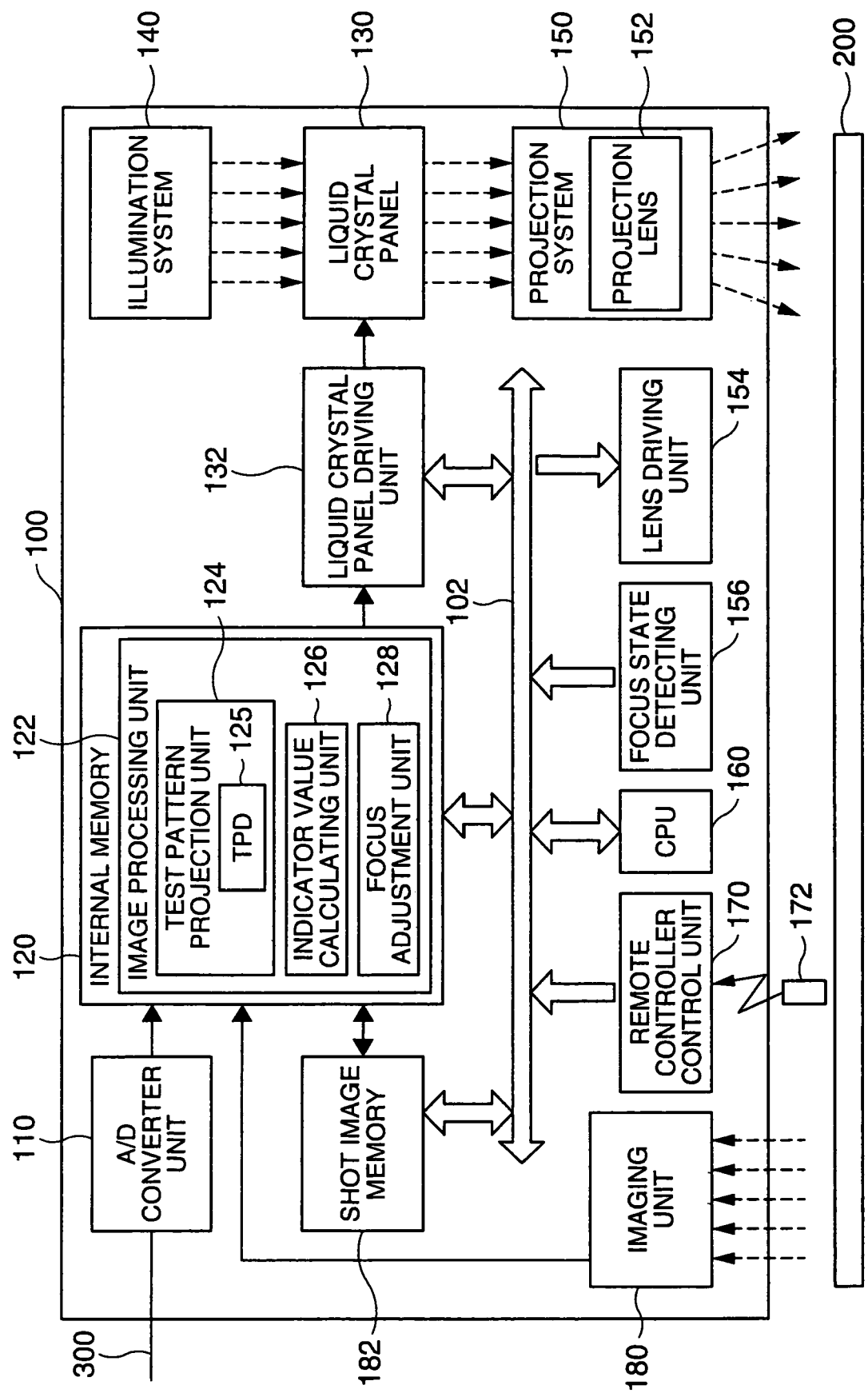
FIG. 1 is an exemplary diagram schematically showing the constitution of a projector as the first embodiment of the invention.

FIG. 1 is an exemplary block diagram schematically showing the constitution of a projector as the first exemplary embodiment of the invention. A projector 100 can display images on a projection surface such as a screen 200 by projecting image light representing images. The projector 100 can include an A/D converter unit 110, an internal memory 120, a liquid crystal panel 130, a liquid crystal panel driving unit 132, an illumination system 140, and a projection system 150 having a projection lens 152, a lens driving unit 154, a focus state detecting unit 156, a CPU 160, a remote controller control unit 170, a remote controller 172, an imaging unit 180, and a shot image memory 182. The internal memory 120, liquid crystal panel driving unit 132, lens driving unit 154, focus state detecting unit 156, CPU 160, remote controller control unit 170, shot image memory 182 are connected to one another via a bus 102.

The A/D converter unit 110 performs A/D conversion on input image signals input via a cable 300 from a DVD player or personal computer (not shown) and outputs them as digital image signals.

In the internal memory 120, a computer program that functions as an image processing unit 122 is stored. The image processing unit 122 performs adjustment to display conditions of images (e.g., brightness, contrast, synchronous, tracking, color density, hue, etc.) on digital image signals output from the A/D converter unit 110, outputs them to the liquid crystal panel driving unit 132. Further, the image processing unit 122 includes functions as a test pattern projection unit 124, an indicator value calculating unit 126, and a focus adjustment unit 128, and the focus adjustment processing is performed by these functions, which will be described later. The test pattern projection unit 124 holds test pattern data TPD as digital image signals.

The liquid crystal panel driving unit 132 drives the liquid crystal panel 130 based on the digital image signals input from the image processing unit 122. The liquid crystal panel 130 modulates the illumination light illuminated from the illumination system 140 into image light representing images.

The projection system 150 having the projection lens 152 can be mounted on the front surface of a casing of the projector 100 for magnification projecting the light modulated into image light by the liquid crystal panel 130. The lens driving unit 154 drives the projection lens 152 to change the focus state or zoom state. Here, the focus state can mean the state in which the focal position is focused on somewhere. Further, the zoom state means the degree of magnification (magnifying power) when the light transmitted through the liquid crystal panel 130 is projected in the projection system 150. Changing the focus state is performed by moving the entire projection lens 152 along an optical axis backward and forward to change the focal position. Further, changing the zoom state is performed by driving the projection lens 152 to change the focal length.

The focus state detecting unit 156 detects the focus state of the projection lens 152. Specifically, the focus state detecting unit 156 includes a variable resistance the resistance value of which changes with the movement of the projection lens 152 and an A/D converter for converting the resistance value of the variable resistance into a digital value. Further, the focus state detecting unit 156 detects a resistance value as a digital value (hereinafter, referred to as focus encoder value) as a value representing the focus state.

The remote controller control unit 170 receives instructions from users through the remote controller 172 and transmits the instructions to the CPU 160 via the bus 102. By the way, in the embodiment, the projector 100 receives instructions from users through the remote controller 172 and the remote controller control unit 170, however, the instructions from users may be received through other configuration such as an operation panel, for example.

The imaging unit 180 can include a CCD camera and generates shot images SI by imaging the images projected on the screen 200. The shot images SI generated by the imaging unit 180 are stored within the shot image memory 182 through the internal memory 120.

The CPU 160 reads out the computer program as the image processing unit 122 from the internal memory 120 and executes it to project images on the screen 200 or perform automatic focus adjustment processing, which will be described later. Further, the CPU 160 controls the operation of the respective units within the projector 100.

Figure 2:
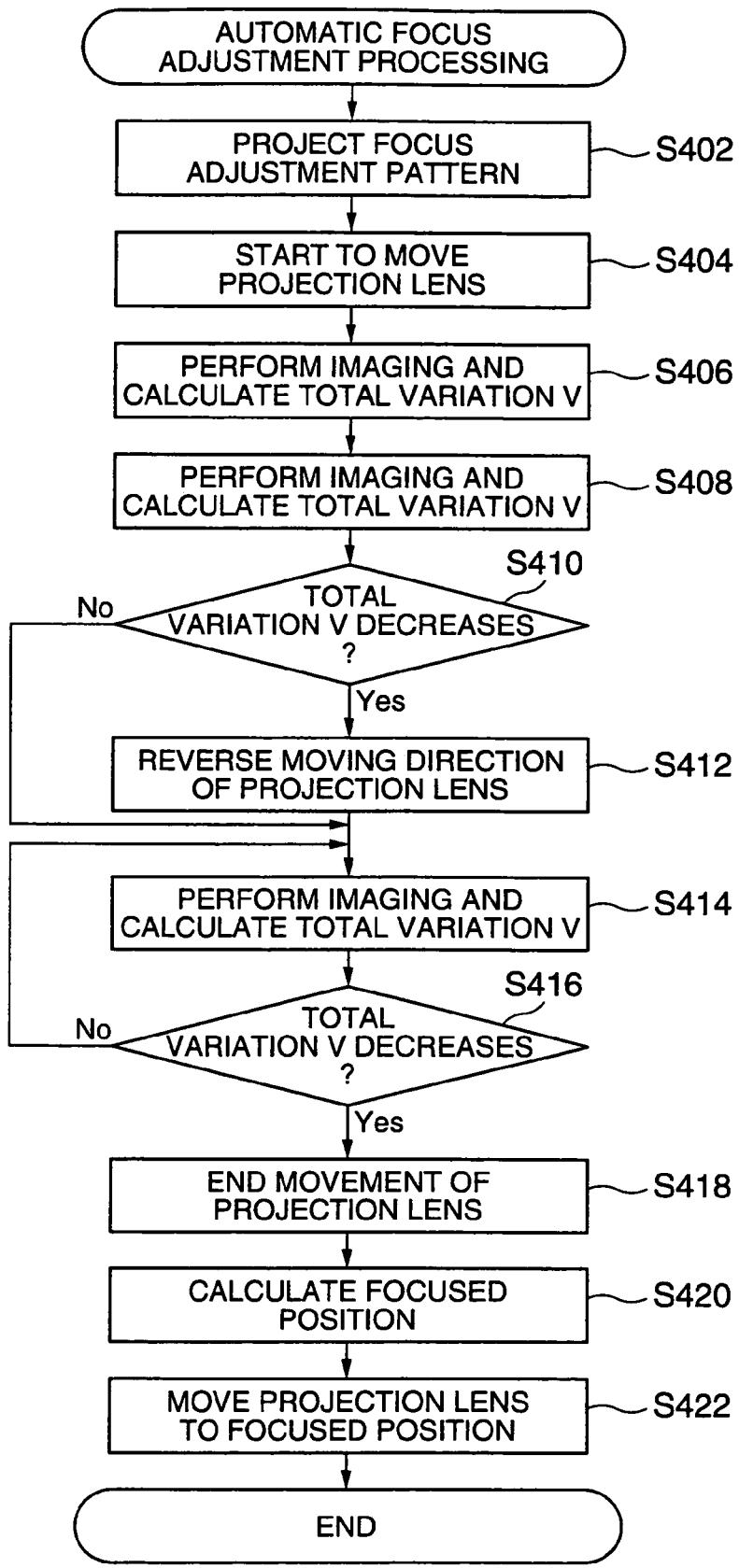
FIG. 2 is a flowchart showing the flow of an exemplary automatic focus adjustment processing by the projector 100.

FIG. 2 is a flowchart showing an exemplary flow of automatic focus adjustment processing by the projector 100. The automatic focus adjustment processing is processing of automatically focusing on the projection surface such as the screen 200. The automatic focus adjustment processing is executed by the instructions from users through the remote controller 172. The automatic focus adjustment processing may be automatically executed as the power supply is turned on, or image signals are input, for example.

At step S402, the test pattern projection unit 124 (FIG. 1) projects a test pattern on the screen 200. The projection of test pattern is performed using the test pattern data TPD held by the test pattern projection unit 124.

Figure 3A:
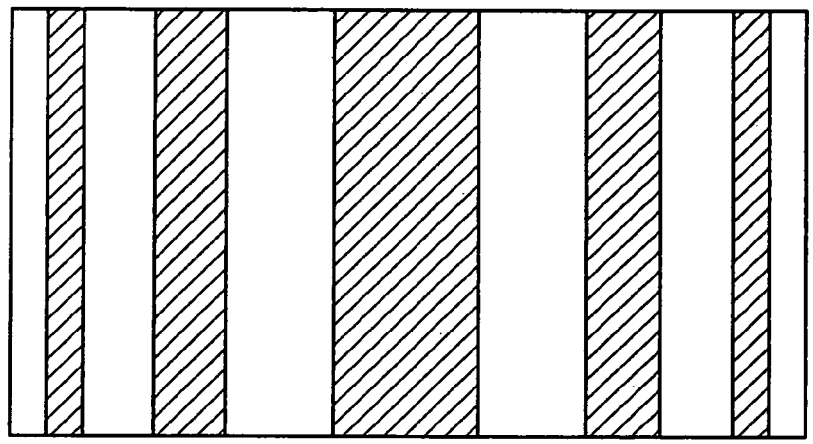
FIGS. 3A and 3B are explanatory diagrams schematically showing a test pattern and an indicator value used for focus adjustment used for the exemplary embodiment.
Figure 3B:
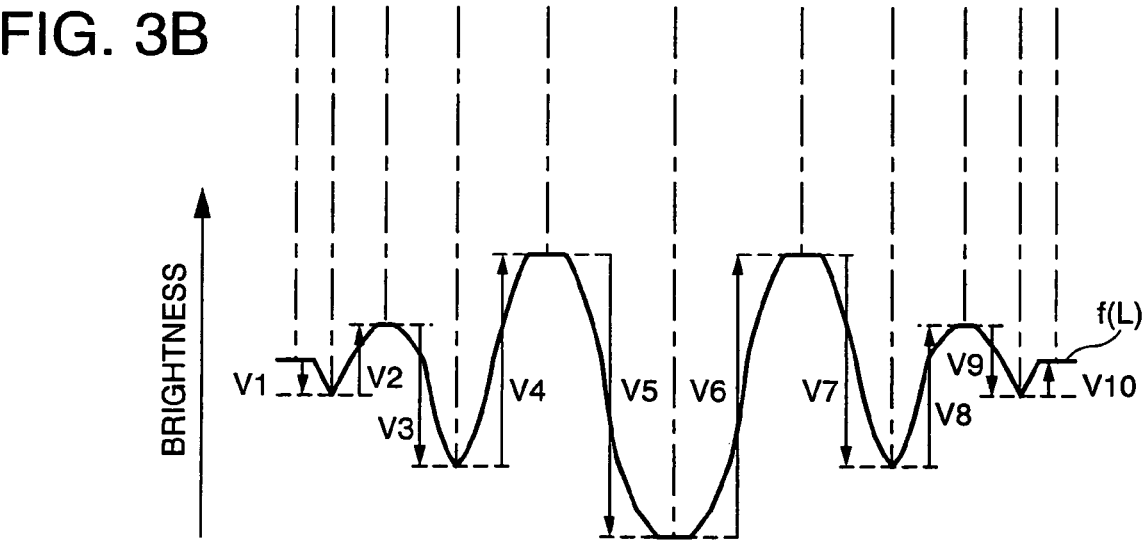

FIGS. 3A and 3B are explanatory diagrams schematically showing a test pattern used for the exemplary embodiment and an indicator value used for focus adjustment. FIG. 3A shows the test pattern used for the embodiment. In the test pattern used for the exemplary embodiment, white areas (areas with no hatching) and block areas (areas with hatching) are alternately arranged in a lateral direction. Further, the test pattern includes plural white areas having different widths from broader to narrower widths. Similarly, the test pattern includes plural black areas having different widths from broader to narrower widths.

At step S404 (FIG. 2), the focus adjustment unit 128 (FIG. 1) controls the lens driving unit 154 to start the movement of the projection lens 152. The lens driving unit 154 moves the projection lens 152 along the optical axis at a predetermined speed. Thereby, the focal position is moved and the focus state is changed. The direction of movement of the projection lens 152 may be either of forward or backward.

At step S406 (FIG. 2), the image processing unit 122 (FIG. 1) controls the imaging unit 180 to image the test pattern projected on the screen 200 for generation of a shot image SI. Further, the indicator value calculating unit 126 analyzes the generated shot image SI and calculates a value of total variation V as an indicator value used for focus adjustment.

An example of the definition of total variation V is shown in FIG. 3B. f(L) in FIG. 3B is a curve representing the brightness change along the width direction of the test pattern of the shot image SI (hereinafter, referred to as brightness curve f(L). The horizontal axis of FIG. 3B corresponds to the position along the width direction in the test pattern shown in FIG. 3A projected within the shot image SI. Further, the vertical axis of FIG. 3B indicates brightness. Here, the total variation V in the exemplary embodiment is defined as a sum of absolute values of differences between the adjacent local maximum values and local minimum values in the brightness curve f(L). That is, in the example in FIGS. 3A and 3B, the total variation V is defined by the following equation.

Total variation=|*V*1|+|*V*2|+ . . . +|*V*10|

Specifically, the value of total variation V can be calculated by calculating brightness differences between adjacent pixels with respect to all pixels along the width direction of the test pattern and summing the absolute values of the brightness differences.

The focus adjustment can be executed on part of areas on the screen 200 as a target. In this case, the calculation of the value of total variation V is performed on the image in the shot image SI corresponding to the area for focus adjustment on the screen 200 as a target.

Figure 4A:
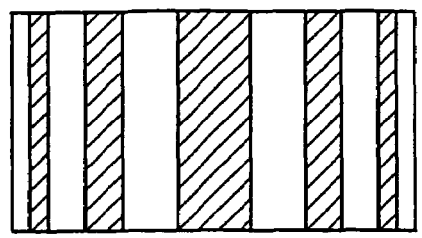
FIGS. 4A to 4G are explanatory diagrams schematically showing the manner of change in the brightness curve and the total variation V with the change in the focus state.

Thus calculated total variation V is used as an indicator value of focus adjustment. As the total variation V is larger, the focal position is determined in the focus state closer onto the screen 200. The reason will be described as below. FIGS. 4A to 4G are explanatory diagrams schematically showing the manner of change in the brightness curve and the total variation V with the change in the focus state. FIG. 4A shows an image of the test pattern projected in the shot image SI. FIGS. 4B to 4F show the manner of change of brightness curve f(L) with the change in the focus state.

Figure 4B:
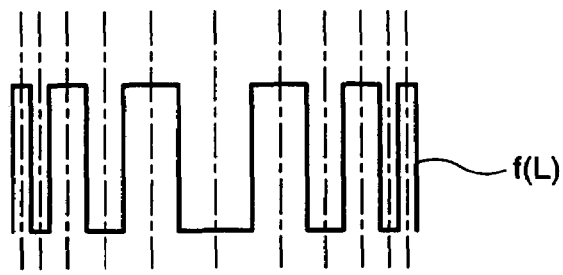

At the time of the focus state in which the focal position is completely focused on the screen 200 (hereinafter, referred to focused state), boundaries between the white areas and black areas are clearly represented in the test pattern projected on the screen 200. Accordingly, the brightness curve f(L) becomes a curve on which brightness of all white areas and black areas take constant values, respectively, and the brightness changes vertically at the boundaries between the white areas and black areas (hereinafter, referred to as area boundaries) as shown in FIG. 4B. The brightness of white areas at this time is referred to as pure white brightness and the brightness of black areas is referred to as pure black brightness. The total variation V at this time becomes a value obtained by adding differences between the pure white brightness and pure black brightness by the number of white areas and black areas.

FIGS. 4C to 4F sequentially show the manner of change of the brightness curve f(L) as the focal position separates from the screen 200. When the focal position is out of the screen 200, the area closer to the area boundary on the test pattern projected on the screen 200 is represented by the mixture of black and white. Accordingly, the brightness becomes lower than the pure white brightness in the white area close to the area boundary, and the brightness becomes higher than the pure black brightness in the black area close to the area boundary. As the focal position further separates from the screen 200, the mixture of black and white also occurs in an area more distant from the area boundary. Therefore, the brightness curve f(L) becomes a smooth curve with smaller increase and decrease and the value of total variation V becomes smaller as the focal position separates from the screen 200.

Figure 4C:
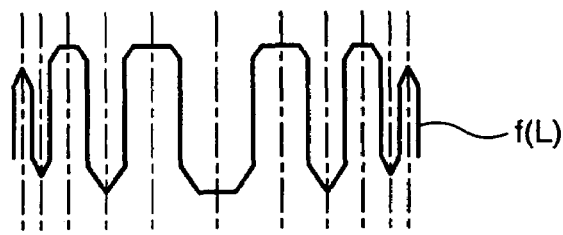
Figure 4D:
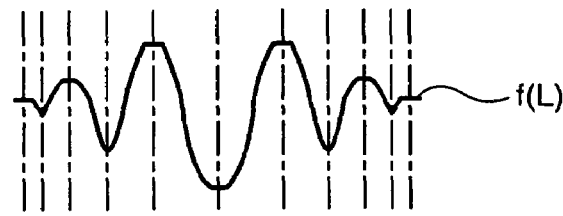
Figure 4E:
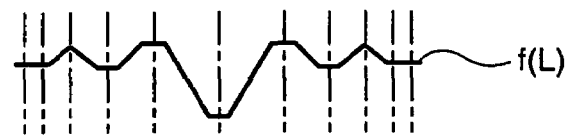
Figure 4F:
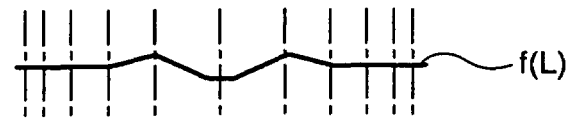
Figure 4G:
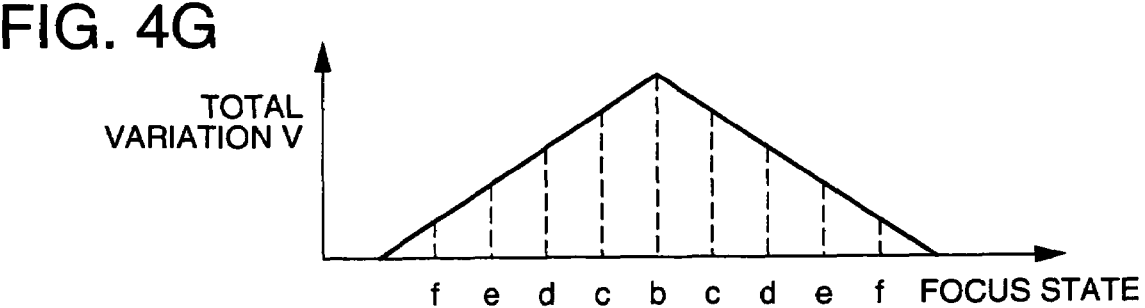

FIG. 4G shows the manner of change of total variation V with the change in the focus state. The focus states shown using signs b to f along the horizontal axis are focus states represented by the brightness curves shown in FIGS. 4B to 4F, respectively. As shown in FIG. 4G, the value of total variation V becomes the maximum when the focus state is the focused state shown in FIG. 4B, and becomes smaller as the focal position separates from the screen 200.

Here, the test pattern used in the exemplary embodiment includes a narrow white area and a narrow black area. In the narrow white area, even when the focal position is in the focus state slightly out of the screen 200 as shown in FIG. 4C, the maximum value of the brightness in the area of interest becomes smaller than the value of pure white brightness. This is in contrast with that, in the broad white area, the maximum value of the brightness in the area of interest is still the same value as the pure white brightness. Similarly, in the narrow black area, the minimum value of the brightness in the area of interest becomes larger than the value of pure black brightness. Accordingly, because of the existence of the narrow white area and narrow black area, even when the focal position is in the focus state slightly out of the screen 200, the value of total variation V decreases. Therefore, the curve representing the change in total variation V shown in FIG. 4G takes the maximum value in the focus state which is the focused state in FIG. 4B, and becomes a curve having sharp peaks in which the value of total variation V changes even if the focus state is slightly changed from the state.

Further, the test pattern used in the exemplary embodiment can include a broad white area and a broad black area. In the broad white area and broad black area, even when the focal position is in the focus state significantly out of the screen 200 as shown in FIG. 4F, there are increase and decrease in the brightness. This is in contrast with that, in the narrow white area and narrow black area, the brightness is at the constant values in the whole areas. Accordingly, because of the existence of the broad white area and broad black area, even when the focal position is in the focus state significantly out of the screen 200, the value of total variation V changes as the focus state changes. Therefore, the curve representing the change in total variation V shown in FIG. 4G becomes a curve in which change in the value of total variation V with the change in focus exists even when the focal position is in the focus state significantly out of the screen 200.

The image processing unit 122 (FIG. 1) acquires a focus encoder value simultaneously with imaging at step S406 (FIG. 2) from the focus state detecting unit 156, and stores the value in a predetermined area within the internal memory 120. Further, in the steps, which will be described in greater detail below, at the time of imaging, the acquisition and storage of focus encoder values are performed simultaneously with imaging.

At step S408 (FIG. 2), the same processing as at step S406 is performed again. That is, the image processing unit 122 (FIG. 1) controls the imaging unit 180 to image the test pattern for generation of a shot image SI, and the indicator value calculating unit 126 calculates the value of total variation V. Here, the imaging at step S408 is executed after a predetermined time has elapsed from the imaging at step S406. Accordingly, the focus state at the time of imaging at step S408 changes from the focus state at the time of imaging at step S406 by the degree at which the projection lens 152 moves in the predetermined time. Therefore, as seen from FIG. 4G, the value of total variation V calculated at step S408 changes from the value of total variation V calculated at step S406.

At step S410 (FIG. 2), the focus adjustment unit 128 (FIG. 1) determines whether the value of total variation V calculated at step S408 has decreased from the value of total variation V calculated at step S406 or not. This determination is performed in order to judge whether the moving direction of the projection lens 152 is appropriate or not. For example, when the value of total variation V decreases, which indicates that the projection lens 152 moves in a direction in which the focus state separates from the focused state, the moving direction of the projection lens 152 is judged as being inappropriate. Therefore, when the value is judged to be decreased at step S410, the process moves to step S412, and the focus adjustment unit 128 (FIG. 1) controls the lens driving unit 154 to reverse the moving direction of the projection lens 152, and then, the process moves to step S414. On the other hand, when the value of total variation V does not decrease, the moving direction of the projection lens 152 is judged as being appropriate. Therefore, when the value is judged to be not decreased at step S410, the process skips step S412 and moves to step S414.

At step S414 (FIG. 2), the same processing as at step S406 is performed again. That is, the image processing unit 122 (FIG. 1) controls the imaging unit 180 to image the test pattern for generation of a shot image SI, and the indicator value calculating unit 126 calculates the value of total variation V. Further, at step S416 (FIG. 2), as well as at step S410, the focus adjustment unit 128 (FIG. 1) determines whether the value of total variation V calculated at step S414 decreases from the value of total variation V previously calculated or not. This determination is performed in order to judge whether the projection lens 152 has passed through the position where the focus state becomes the focused state or not. At the initial time of step S414, because the projection lens 152 moves in the direction in which the focus state approaches the focused state, the value of total variation V increases with the movement of the projection lens 152.

Afterwards, when the projection lens 152 passes through the position where the focus state becomes the focused state, because the focus state separates from the focused state, the value of total variation V decreases with the movement of the projection lens 152. Therefore, at step S416, when the value of total variation V is determined to be decreased, that indicates the projection lens 152 has passed through the position where the focus state becomes the focused state. The step S414 and step 416 are repeated until the value of total variation V is determined to be decreased. That is, at step S416, when the value of total variation V is determined to be not decreased, the process returns to step S414, imaging and calculation of the value of total variation V are performed again. At step S416, the value of total variation V is determined to be decreased, the process moves to step S418.

At step S418 (FIG. 2), the focus adjustment unit 128 (FIG. 1) controls the lens driving unit 154 to end the movement of the projection lens 152.

At step S420 (FIG. 2), the focus adjustment unit 128 (FIG. 1) calculates the focused position. Here, the focused position means the position of the projection lens 152 where the focus state becomes the focused state. In the exemplary embodiment, the calculation of the focused state is performed by calculating the focus encoder value when the focus state becomes the focused state. Here, at the above described steps S406, S408, and S414, the values of total variation V are calculated in association with the focus encoder value. Using these values, the total variation V to the focus encoder value is approximated or interpolated by a straight line or curved line. Then, the focus encoder value when the total variation V takes the maximum value is calculated. Thus, the focus encoder value when the focus state becomes the focused state is calculated.

At step S422 (FIG. 2), the focus adjustment unit 128 (FIG. 1) controls the lens driving unit 154 to move the projection lens 152 to the focused position. The movement of the projection lens 152 to the focused position can be performed by position monitoring by polling using the focus encoder value, for example.

By performing the above processing, the projector 100 of the exemplary embodiment can automatically perform focus adjustment. Here, as described above, the test pattern used for the automatic focus adjustment processing by the projector 100 of the embodiment includes the narrow white area and narrow black area. Accordingly, the value of total variation V increases and decreases with the change in focus state even when the focus state is a state close to the focused state. Therefore, the projector 100 of the embodiment can perform automatic focus adjustment with high precision.

The widths of the narrow white area and narrow black area are preferably widths corresponding to one to three pixels in the shot image SI, more preferably, corresponding to one to two pixels. Note that one pixel in the shot image SI means one pixel of the imaging unit 180.

Further, as described above, the test pattern used for the automatic focus adjustment processing by the projector 100 of the embodiment includes the broad white area and broad black area. Accordingly, the value of total variation V increases and decreases with the change in focus state even when the focus state is a state significantly separating from the focused state. Therefore, even when the focus state is a state significantly separating from the focused state, the direction in which the projection lens 152 should be moved can be determined promptly. Thus, the projector 100 of the exemplary embodiment can perform automatic focus adjustment at a high speed.

The widths of the broad white area and broad black area are preferably widths corresponding to 15 to 30 pixels in the shot image SI, more preferably, corresponding to 20 to 30 pixels.

Furthermore, since the projector 100 of the exemplary embodiment can include the focus state detecting unit 156, automatic focus adjustment can be performed at a higher speed by calculating the focused position and moving the projection lens 152 thereto.

The automatic focus adjustment processing of the exemplary embodiment can be applied to various projectors because the processing is hard to be influenced by the optical characteristics, the precision of the imaging unit 180, assembly precision of the casing of the projector 100, etc.

Figure 5:
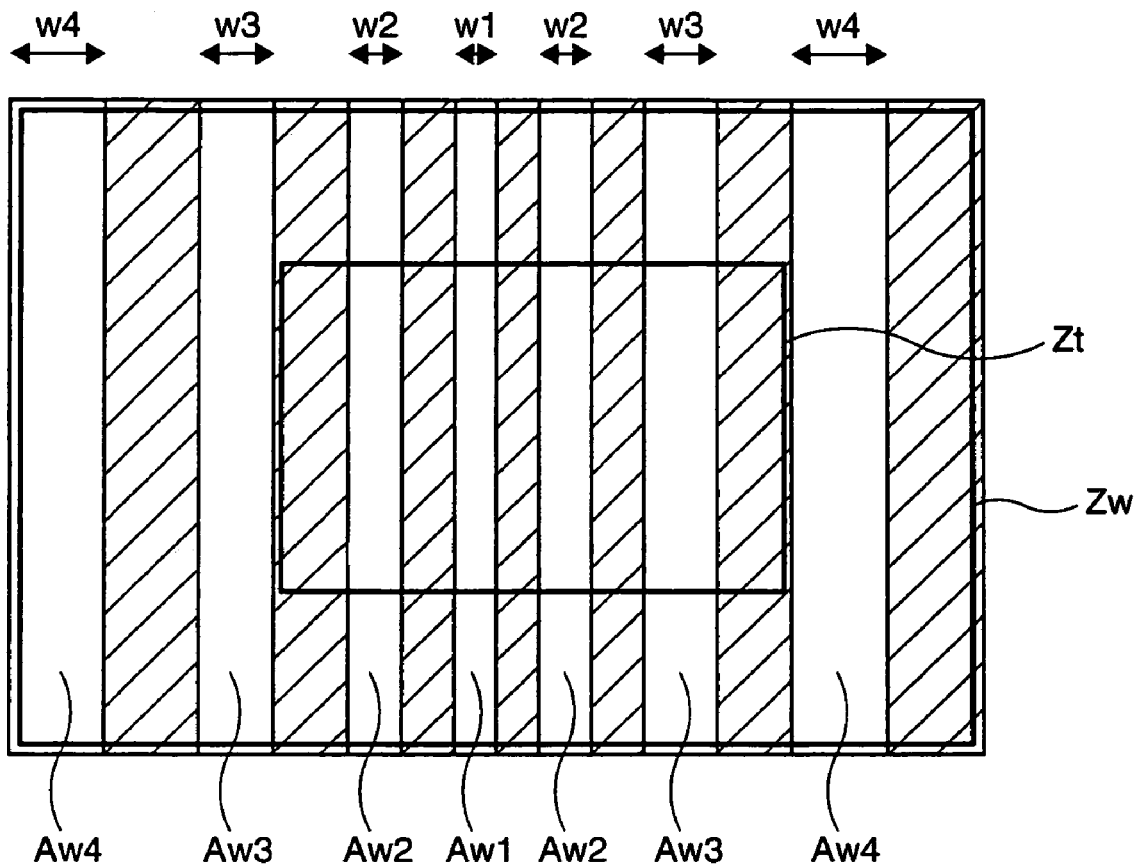
FIG. 5 is an explanatory diagram schematically showing a test pattern used for automatic focus adjustment processing of the second exemplary embodiment.

FIG. 5 is an explanatory diagram schematically showing a test pattern used for automatic focus adjustment processing of the second exemplary embodiment. The test pattern used for automatic focus adjustment processing of the second exemplary embodiment is different from the test pattern of the first exemplary embodiment shown in FIG. 3A in the point where a narrow area is located at the center, and further, width ratios between adjacent two white areas and width ratios between adjacent two black areas are constant, respectively. That is, the ratio ra of width w1 of the narrowest white area Aw1 located at the center to the width w2 of the second narrowest white area Aw2 located adjacent thereto takes the same value as the ratio rb of width w2 of the white area Aw2 to the width w3 of the third narrowest white area Aw3 located adjacent thereto. Similarly, the ratio rc of width w3 of the white area Aw3 to the width w4 of the white area Aw4 takes the same value. Further, regarding the black areas, similarly, ratios between adjacent two black areas are constant.

The test pattern of the second exemplary embodiment can be used for automatic focus adjustment in plural different zoom states of the projector 100. That is, for example, when the zoom state is tele, the test pattern in the part of area Zt shown in FIG. 5 is used, and, when the zoom state is wide, the test pattern in the part of area Zw shown in FIG. 5 is used. Here, the test pattern can include the narrow areas and broad areas in the plural different zoom states because the width ratios between adjacent two white areas and width ratios between adjacent two black areas are constant, respectively. Therefore, in the second exemplary embodiment, the automatic focus adjustment in the plural different zoom states can be performed using only one test pattern, and the convenience of automatic focus adjustment can be improved.

In the test pattern of the second exemplary embodiment, the widths of the narrow areas are preferably the widths corresponding to one to three pixels in the shot image SI, more preferably, corresponding to one to two pixels when the zoom state is the most tele side state. Further, the widths of the broad areas are preferably the widths corresponding to 15 pixels to 30 pixels in the shot image SI, more preferably, corresponding to 20 pixels to 30 pixels when the zoom state is the most tele side state.

Further, in the test pattern of the second exemplary embodiment, the widths of the narrow areas are also preferably the widths corresponding to one to three pixels in the shot image SI, more preferably, corresponding to one to two pixels when the zoom state is the most wide side state. Further, the widths of the broad areas are also preferably the widths corresponding to 15 pixels to 30 pixels in the shot image SI, more preferably, corresponding to 20 pixels to 30 pixels when the zoom state is the most wide side state.

It should be understood that this invention is not limited to the above exemplary embodiments and mode for carrying out the invention, but can be implemented in various aspects without departing from the scope thereof, and modifications as below can be made, for example.

The test patterns shown in the above respective exemplary embodiments are only examples, and automatic focus adjustment processing may be performed using other test patterns. For example, in the embodiments, the test patterns in which white areas and black areas are alternately arranged are used, however, a test pattern may be used as long as it includes two kinds of density areas having different density from each other alternately arranged, for example, white areas may be colored by other colors than white and black areas may be colored by other colors than black. Further, the plural white areas do not necessarily have the same color as one another, and the plural black areas do not necessarily have the same color as one another.

Further, in the embodiments, the test patterns including narrow areas and broad areas with respect to both of the white areas and black areas are used, however, a test pattern including a narrow area and a broad area with respect to only one of the white areas and black areas may be used.

Further, in the embodiment, the test patterns in which white areas and black areas are alternately arranged along only one direction (horizontal direction) are used, however, a test pattern in which white areas and black areas are alternately arranged also along the direction perpendicular to the above direction (vertical direction) (i.e., checkered pattern) may be used. In this case, the value of total variation V along the vertical direction can be used as an indicator value used for automatic focus adjustment processing, or the values of total variation V are calculated with respect to horizontal direction and vertical direction, respectively, and both of them can be used.

In the above exemplary embodiments, the value of total variation V is calculated by calculating brightness differences between adjacent pixels with respect to all pixels and summing the absolute values of the brightness differences, however, the value may be calculated by other methods. For example, the value can be calculated by calculating the local maximum values and local minimum values of the brightness curve using a differentiation circuit or differentiation filter and summing absolute values of the differences. Further, the total variation V can be calculated by measuring the positions in which the central points of the respective white areas and the respective black areas of the test pattern along the width direction are projected within the shot image SI in advance, and using the brightness in the positions of interest in the shot image SI as the local maximum values and local minimum values. According to these methods, the number of calculations can be reduced and further speeding up of the processing can be achieved.

As an indicator value used for focus adjustment, different indicator values than the values of total variation V used in the above embodiments may be used, and generally, an indicator value relating to the focus state obtained by analyzing the shot image SI of the test pattern can be used. For example, the average of the brightness curve is calculated and the sum of the absolute values of differences from the average in the respective points on the brightness curve can be used as an indicator value. Further, the shot image SI is frequency analyzed and the amount of contained high frequency components can be used as an indicator value.

In the above exemplary embodiments, judgment as to whether the moving direction of the projection lens 152 is appropriate or not is performed using the value of total variation V calculated at two steps of step S406 and step S408 in FIG. 2, however, the reliability can be improved by the judgment using the value of total variation V calculated at three or more steps.

Further, in the above exemplary embodiments, at step S416 (FIG. 2), if the value of total variation V is once determined to be decreased, the movement of the projection lens 152 is ended, and the calculation of the focused position and movement of the projection lens 152 to the focused position are performed, however, if the value of total variation V is once determined to be decreased, the focus adjustment can be performed with higher precision, by reversing the moving direction of the projection lens 152 and measuring the variation in total variation V again.

In the above exemplary embodiments, the imaging unit 180 has the CCD camera, however, the imaging unit 180 may have another imaging device such as a CMOS camera, for example.

In the above exemplary embodiments, the detection of focus state is performed using the variable resistance, however, the focus state may be detected by other methods. For example, a rotary encoder may be attached to the projection lens 152 and the focus state may be detected from the output value of the rotary encoder. Further, a stepping motor may be used as the lens driving unit 154 and the focus state may be detected from the amount of driving of the motor.

In the above exemplary embodiments, the movement of the projection lens 152 to the focused position is performed by the position monitoring by polling using the focus encoder value, however, it may be performed by other methods. For example, a rotary encoder may be attached to the projection lens 152 and the movement of the projection lens 152 may be performed by the position monitoring by the polling using the rotary encoder. Further, a stepping motor may be used as the lens driving unit 154 and the movement of the projection lens 152 may be performed based on the amount of driving of the motor. Furthermore, the motor driving time is calculated by the moving speed of the projection lens 152, which has been measured in advance, and the movement of the projection lens 152 can be performed by driving the motor for the time.

In the above exemplary embodiments, only one liquid crystal panel 130 is shown, however, plural liquid crystal panels 130 for plural color components may be provided. Further, an electro-optic device (e.g., DMD (registered trademark of Texas Instruments, Inc.)) other than the liquid crystal panel may be used. Further, the projector 100 may be a CRT projector.

In the above exemplary embodiments, the screen 200 is used as the projection surface, however, others such as a white board or wall surface, for example, can be used as the projection surface.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector that displays an image on a projection surface, the projector comprising:
   a test pattern projecting unit that projects a predetermined test pattern on the projection surface;
   a focus changing unit that moves a focal point of the projector;
   an imaging unit that performs imaging of the projected test pattern to generate a shot image;
   an indicator value calculating unit that calculates an indicator value relating to a focus state of the shot image varying with movement of the focal point; and
   a focus adjustment unit that performs focus adjustment that focuses the focal point on the projection surface using the indicator value,
   the test pattern including a first kind and a second kind of density areas alternately arranged and having different density with each other, and at least the first kind of density areas including a narrow area and a broad area,
   the indicator value being a value that indicates a degree of increase and decrease of brightness along a width direction of the first kind and the second kind of density areas in the shot image.

2. The projector according to claim 1,
   a width of the narrow area being a width corresponding to one pixel to three pixels within the shot image; and
   a width of the broad area being a width corresponding to 15 pixels to 30 pixels within the shot image.

3. The projector according to claim 2,
   the test pattern including the narrow area and the broad area in both cases where a zoom state is at a most tele side and the zoom state is at a most wide side.

4. The projector according to claim 3,
   the test pattern having a constant width ratio between two areas adjacent with the second kind of density area therebetween with respect to the first density areas.

5. The projector according to claim 1,
   the indicator value being a value correlated with a sum of absolute values of differences between adjacent local maximum values and local minimum values in a curve representing a change in brightness along the width direction.

6. The projector according to claim 5,
   the local maximum values and local minimum values being brightness values in predetermined positions in the shot image that are set based on the density area arrangement in the test pattern.

7. A focus adjustment method in a projector that displays an image on a projection surface, the method comprising:
   projecting a predetermined test pattern on the projection surface;
   moving a focal point of the projector;
   imaging the projected test pattern to generate a shot image;
   calculating an indicator value relating to a focus state of the shot image varying with movement of the focal point;
   performing focus adjustment that focuses the focal point on the projection surface using the indicator value,
   the test pattern including a first kind and a second kind of density areas alternately arranged and having different density with each other, and at least the first kind of density areas including a narrow area and a broad area, and
   the indicator value being a value that indicates a degree of increase and decrease of brightness along a width direction of the first kind and the second kind of density areas in the shot image.

8. A computer-readable medium including a focus adjustment computer program that adjust a focus in a projector that displays an image on a projection surface, the program allowing the projector to perform:
   a test pattern projecting function of projecting a predetermined test pattern on the projection surface;
   a focus changing function of moving a focal point of the projector;
   an imaging function of performing imaging the projected test pattern to generate a shot image;
   an indicator value calculating function of calculating an indicator value relating to a focus state of the shot image varying with movement of the focal point; and
   a focus adjustment function of performing focus adjustment that focuses the focal point on the projection surface using the indicator value,
   the test pattern including a first kind and a second kind of density areas alternately arranged and having different density with each other, and at least the first kind of density areas including a narrow area and a broad area,
   the indicator value being a value that indicates a degree of increase and decrease of brightness along a width direction of the first kind and the second kind of density areas in the shot image.

* * * * *